(12) United States Patent
Porikli et al.

(10) Patent No.: US 8,121,669 B2
(45) Date of Patent: Feb. 21, 2012

(54) METHOD FOR TRACKING SOFT TISSUE MASSES IN IMAGES USING DIRECTED GRAPHS

(75) Inventors: Fatih M. Porikli, Watertown, MA (US); Quan Yuan, Allston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 989 days.

(21) Appl. No.: 12/098,522

(22) Filed: Apr. 7, 2008

(65) Prior Publication Data

US 2009/0253102 A1 Oct. 8, 2009

(51) Int. Cl.
*A61B 5/05* (2006.01)
(52) U.S. Cl. ......... 600/425; 600/431; 600/437; 600/458
(58) Field of Classification Search ................... 600/425, 600/431, 437, 458
See application file for complete search history.

(56) References Cited

U.S. PATENT DOCUMENTS

| | | | |
|---|---|---|---|
| 5,220,922 A | 6/1993 | Barany | |
| 5,462,059 A | 10/1995 | Ferrara et al. | |
| 5,628,321 A | 5/1997 | Scheib et al. | |
| 6,708,055 B2 * | 3/2004 | Geiser et al. | 600/425 |
| 6,797,257 B2 * | 9/2004 | McDonald et al. | 424/9.32 |
| 6,858,007 B1 * | 2/2005 | Akselrod et al. | 600/437 |
| 6,858,011 B2 * | 2/2005 | Sehgal | 600/458 |
| 2008/0077015 A1 | 3/2008 | Boric-Lubecke | |
| 2008/0317308 A1 * | 12/2008 | Wu et al. | 382/128 |
| 2008/0319375 A1 * | 12/2008 | Hardy | 604/22 |

OTHER PUBLICATIONS

Novotny, Paul M. et al.; "GPU Based Real-Time Instrument Tracking with Three Dimensional Ultrasound"; Medical Image Analysis II; 2007; pp. 458-464; Elsevier Inc.; USA.
Langen, K. M. et al.; "Evaluation of Ultrasound-Based Prostate Localization for image-Guided Radiotherapy"; Int. J. Radiation Oncology Biol, Phys.; 2003; pp. 635-644; vol. 57; No. 3; Elsevier Inc.; USA.
Kruppa, Alexandre; "Real-Time Tissue Tracking with B-Mode Ultrasound Using Speckle and Visual Servoing"; Int. Conf. on Medical Image Computing and Computer-Assisted Intervention; Oct. 2007; p. 1-8; vol. 2; LNCS 4792; Brisbane; Australia.
Fung, Albert Y. C.; "Ultrasound-Based Guidance of Intensity-Modulated Radiation Therapy"; Medical Dosimetery; 2006; pp. 20-29; vol. 31; No. 1; American Association of Medical Dosimetrists; USA.
Hsu, A.; "Feasibility of Using Ultrasound for Real-Time tracking During Radiotherapy"; Med. Phys.; Jun. 2005; pp. 1500-1512; vol. 32; No. 6; American Association Physicists in Medicine.
Sarrut, David; "A Comparison Framework for Breathing Motion Estimation Methods from 4D Imaging"; IEE Transaction on Medical Imaging; Dec. 2007; pp. 1636-1648; vol. 26; issue 12.

\* cited by examiner

*Primary Examiner* — Tse Chen
*Assistant Examiner* — Baisakhi Roy
(74) *Attorney, Agent, or Firm* — Dirk Brinkman; Gene Vinokar (57) ABSTRACT

Region of interest (ROI) corresponding to a soft tissue mass are tracked in a training video acquired by sonography. The locations of the ROI are used to construct a directed graph in which each node represents a location of the tracked ROI, and the edges represent temporal relations of the ROIs. The soft tissue mass can also be tracked using the graph, and appropriate treatment can be delivered.

25 Claims, 10 Drawing Sheets

METHOD FOR TRACKING SOFT TISSUE MASSES IN IMAGES USING DIRECTED GRAPHS

FIELD OF THE INVENTION

The present intention relates generally to tracking soft tissues, and more particularly to tracking soft tissue masses using directed graphs.

BACKGROUND OF THE INVENTION

Ultrasonic Imaging

Ultrasound is an acoustic signal with a frequency greater than the upper limit of human hearing, approximately 20 kHz. By penetrating soft tissue, and measuring the reflection signal, the ultrasound can reveal the structure of the tissue.

Medical sonography is an ultrasound-based diagnostic medical imaging technique used to visualize anatomical structures, such as muscles, tendons, and many other internal organs. The visualization reveals the size, shape, and pathological conditions of the structures. Ultrasound is also used to visualize a fetus during prenatal care.

Medical sonography is one of the most widely used diagnostic tools in modern medicine. The technology is relatively inexpensive and portable. As currently applied in the medical environment, ultrasound poses no known risks to the patient. Sonography is generally described as a safe test because it does not use ionizing radiation, which imposes hazards, such as cancer and chromosome breakage.

An ultrasonic signal is typically produced by a piezoelectric transducer encased in a probe. Strong, short electrical pulses from the ultrasound scanner make the transducer vibrate at the desired frequency. The frequencies can be anywhere between 2 and 15 MHz. The sound is focused either by the shape of the transducer, a lens in front of the transducer, or a complex set of control pulses from the ultrasound scanner. This focusing produces an arc-shaped sound wave from the face of the transducer. The wave travels into the body and comes into focus at a desired depth. Newer technology transducers use phased array techniques to enable the sonographic scanner to change the direction and depth of focus. Almost all piezoelectric transducers are made of ceramic. Materials on the face of the transducer enable the sound to be transmitted efficiently into the body. For example, a water-based gel is typically placed between the skin and the probe.

The sound wave is partially reflected from tissues having different densities. Specifically, sound is reflected anywhere there are density changes in the body, e.g. blood cells in blood plasma, small structures in organs, and other body fluids. Some of the reflections return to the transducer. The reflected sound vibrates the transducer, the transducer turns the vibrations into electrical pulses that travel to the ultrasonic scanner where the pulses are processed and transformed into an image.

It could be noted that sound wave is usually a short pulse with a specific carrier frequency. Moving objects change this frequency on reflection, so that the Doppler effect, which shifts the frequency, can be used. Therefore, the sonographic scanner operates as follows. The signals strength and length of time between transmitting and receiving the signal is measured. From this, the focal length for the phased array is deduced to enable rendering of an in-focus image of at a particular depth. The image can be in color.

Conventional ultrasound scanners display the images as thin, flat sections of the body. Advancements in ultrasound technology include three-dimensional (3-D) ultrasound, which formats the sound wave data into 3-D images. Four-dimensional (4-D) ultrasound is 3-D ultrasound with motion. Four different modes of ultrasound are used in medical imaging.

1. A-mode: A-mode is the simplest type of ultrasound. A single transducer scans a line through the body with the echoes plotted on a screen as a function of depth. Therapeutic ultrasound aimed at a specific tumor or calculus is also A-mode, to allow for pinpoint accurate focus of the destructive wave energy.
2. B-mode: In B-mode ultrasound, a linear array of transducers simultaneously scans a plane through the body that can be viewed as a two-dimensional image on screen.
3. M-mode: M stands for motion. In M-mode, a rapid sequence of B-mode scans, where images follow each other in sequence on screen, enable users to see and measure range of motion, as the organ boundaries that produce reflections move relative to the probe.
4. Doppler mode: This mode makes use of the Doppler effect.

Doppler ultrasound is a special ultrasound technique that evaluates, e.g., blood flow in the major arteries, and veins in the abdomen, arms, legs and neck. There are three types of Doppler ultrasound.

1. Color Doppler uses a computer to convert Doppler measurements into an array of colors to visualize the speed and direction of blood flow through a blood vessel.
2. Power Doppler is a newer technique that is more sensitive than color Doppler and capable of providing greater detail of blood flow, especially in vessels that are located inside organs. Power Doppler, however, does not help the user to determine the direction of flow, which may be important in some situations.
3. Spectral Doppler displays blood flow measurements graphically, in terms of the distance traveled per unit of time, instead of displaying Doppler measurements visually.

There are several advantages of ultrasound imaging. It images muscle and soft tissue well and is particularly useful for delineating the interfaces between solid and fluid-filled spaces. It can render images in real-time, where the user can dynamically select the most useful section for diagnosing and documenting changes, often enabling rapid diagnoses. It also shows the structure of organs.

As a disadvantage, sonography does not penetrate bone very well. Therefore, sonography of the brain is very limited. In addition, it performs very poorly when there is a gas between the transducer and the organ of interest, due to the extreme differences in sound impedance. For example, overlying gas in the gastrointestinal tract often makes ultrasound scanning of the pancreas difficult, and lung imaging is not possible, apart from demarcating pleural effusions. Even in the absence of bone or air, the depth penetration of ultrasound is limited, making it difficult to image structures deep in the body, especially in obese patients.

Directed Graphs

A graph G is an ordered pair G:=(V, E) that is subject to the following conditions.

1. V is a set, whose elements are called vertices or nodes; and
2. E is a set of edges connecting pairs of nodes.

The vertices belonging to an edge are called the ends, endpoints, or end vertices of the edge. The order of a graph is $|V|$, i.e., the number of vertices. A graph's size is $|E|$, the number of edges. The degree of a vertex is the number of other vertices that are connected to the vertex by edges.

There are two broad categories of graphs: directed graphs (digraphs), and undirected graph. A directed graph or digraph G is an ordered pair G:=(V, A) where A is a set of ordered pairs of vertices, called directed edges. If there is an edge (v, w), then node w is adjacent to node v. A graph is a weighted graph if a positive number (weight) is assigned to each edge. Such weights can represent, for example, costs, lengths or capacities. The weight of the graph is the sum of the weight assigned to all edges. The weight of an edge in a directed graph is often thought of as its length. The length of a path $<v_0, v_1, \ldots, v_n>$ is the sum of the lengths of all component edges $<v_i, v_{i+1}>$.

Breathing Cycle Estimation

U.S. Pat. No. 6,237,593 describes methods for estimating breathing (respiration) in continuous positive airway pressure (CPAP) treatment. The CPAP apparatus typically includes a flow generator for supplying air to a mask via a gas delivery tube. With changing air flow, the flow generator's speed and/or driving electrical current alters in a manner defined by the controlling circuitry. Signals can be derived from measurements of motor speed and current, and these signals vary cyclically with patient respiration. By filtering to reject non-respiratory components, the resultant signal can be utilized to determine the instants in time at which the patient starts to inhale and exhale. The filtered signal also can be linearized using a predetermined knowledge of the pressure/flow/speed characteristics of the flow generator, and thus to derive a volumetric measure of airflow.

Motto et al. describe a procedure for the automated estimation of the phase relation between thoracic and abdominal breathing signals measured by inductance plethysmography (RIP), Motto et al., "Automated estimation of the phase between thoracic and abdominal movement signals," IEEE Transactions on Biomedical Engineering, Volume 52, Issue 4, Pages 614-621, April 2005. That estimation is performed using linear filters, binary converters and an exclusive-or gate. The filters are designed off-line from prior knowledge of the spectrum of subjects' respiration, reducing computational complexity and providing on-line processing capabilities. Some numerical results based on simulated time series and infant respiration data are provided, showing that the method is less biased than the Pearson correlation method, commonly used for assessment of thoraco-abdominal asynchrony.

Sarrut et al., describe a criteria incorporating spatiotemporal information to evaluate the accuracy of model-based methods capturing breathing motion from 4-DCT images, see Sarrut et al., "A Comparison Framework for Breathing Motion Estimation Methods From 4-D Imaging," IEEE Transactions on Medial Imaging, Volume 26, Issue 12, Pages 1636-1648, December 2007. That evaluation relies on the identification and tracking of landmarks in the 4-DCT images.

Radiotherapy

Radiotherapy attempts to direct high-energy ionizing radiation at tumors while sparing healthy tissue. One form of radiation therapy is particle beam therapy, where a depth of a maximum exposure can be controlled. However, the location of the tumors, especially tumors near organs, such that liver, lung, stomach and heart, can change significantly during the treatment as the diaphragm moves in and out. Therefore, it is desired to measure the change of location and shape of the tumor and organs so that the radiation beam can be appropriate controlled.

Radiotherapy uses ionizing radiation as part of cancer treatment to control malignant cells. It may be used for curative or adjuvant cancer treatment. It is used as palliative treatment, where a cure is not possible and the aim is for local disease control or symptomatic relief, or as therapeutic treatment, where the therapy has survival benefit and it can be curative. Radiotherapy is used for the treatment of malignant tumors, and may be used as the primary therapy. It is also common to combine radiotherapy with surgery, chemotherapy, hormone therapy or some combination of the three.

Radiation therapy is commonly applied primarily to the tumor. The radiation fields may also include adjacent lymph nodes if they are clinically involved with the tumor, of if there is thought to be a risk of sub-clinical malignant spread. It is necessary to include a margin of normal tissue around the tumor to allow for uncertainties in the set-up of the patient, and internal tumor motion.

It should be noted, that radiotherapy is typically provided over several weeks, e.g., three or four, to allow the patient to recover between treatments. Thus, identical set-ups are difficult to achieve. Therefore, the patient's skin is usually marked with indelible ink, during treatment planning, to indicate to the radio therapist technician how to set-up the patient relative to the treatment machine. A light beam, which is collocated with the radiation source, can be used to aim the beam and adjust the collimator during the set-up.

The uncertainties in the set-up can also be caused by internal movement, for example, respiration and bladder filling, and movement of external skin marks relative to the tumor location.

To spare normal tissues, such as skin or organs, which radiation must pass penetrated, in order to treat the tumor, shaped radiation beams are aimed from several angles of exposure to intersect at the tumor, providing a much larger absorbed at the tumor than in the surrounding, healthy tissue. Typically, the radiation source is placed on a gantry that rotates around the patient. The goal is to place the tumor at the center of the circle, so that the beam always passed the tumor, and much less frequently through healthy tissue.

SUMMARY OF THE INVENTION

Region of interest (ROI) corresponding to a soft tissue mass are tracked in a training video acquired by sonography. The locations of the ROI are used to construct a directed graph in which each node represent a location of the tracked ROI, and the edges represent temporal relations of the ROIS. The soft tissue mass can also be tracked using the graph, and appropriate treatment can be delivered.

DETAILED DESCRIPTION OF THE PREFERRED EMBODIMENTS

Figure 1:
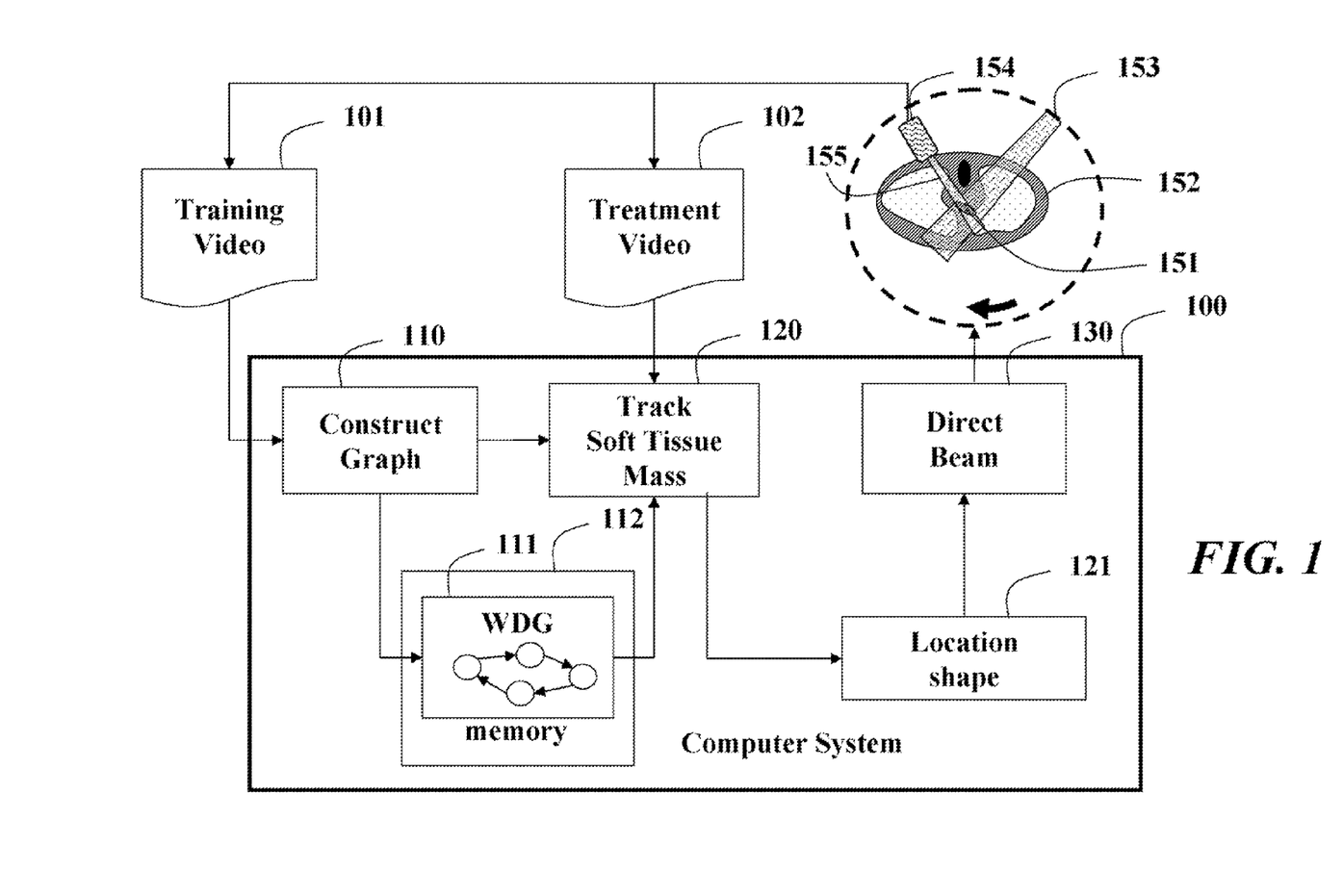
FIG. 1 is a block diagram of a method and system for locating a moving tumor according to an embodiment of the invention.

As shown in FIG. 1, the embodiments of our invention provide a method and system 100 for tracking a soft tissue mass 151 inside a body 152. In one embodiment, the soft tissues mass is a tumor, and its motion is correlated to the cyclic behavior of respiration, or the pulsation of the heart. Thus, the motion can be accurately predicted. In addition, the respiration cycle information can be used to control and direct a radiation beam 153 at the tumor.

Our invention can also be used to refine or otherwise improve reconstructed ultrasound images and other 3D/4D representations derived from ultrasound data. By estimating the respiration cycle, we register a sequence of images corresponding to the same phase. This enables us to obtain higher resolution ultrasound images and 3D/4D representation. Furthermore, such an aggregation of same phase images can be used to decrease noise in the ultrasonic data.

A training video 101, i.e., a sequence of ultrasound images or images, is acquired of the soft tissue mass using sonography 154. For example, the training video is obtained during treatment planning for radiotherapy, in case of a Doppler ultrasound signal 155, each image contains flow information. For 3D and 4D ultrasound data, each image is a 3D or 4D (3D plus motion vectors) representation, respectively. Our invention applies temporal time series analysis to ultrasound data.

A region of interests (ROI) is marked in the first image of the training video, using either manual or automated techniques, such as object detection. The marking can outline the location and shape of the soft tissues mass, e.g., the tumor 151. Alternatively, nothing is marked. Either the whole image or a group of selected sub-regions within the image are assigned as the ROI. The selection can be random.

The location and shape of the ROI is then tracked over time to determine exemplars for matching during treatment. Because the ultrasound image intensity values vary due to internal organ motion, transducer noise, imaging noise, etc, the images are first normalized. This is done for each image by subtracting the mean and dividing by the standard deviation of the intensity values of the pixels. Then, the matching is done using a normalized cross-correlation or a sum-of-squared difference metric.

To enable imposing temporal constraints and to achieve real-time tracking performance during treatment, the exemplars are organized into a directed graph 111 of nodes and edges. The graph is stored in a memory 112. The nodes represent the examplars, and the directed edges in the graph represent the temporal transition relations between the exemplars. The edges are weighted according to the normalized number of transitions made from a current node to a child node, and the matching score.

To construct the directed graph 111 of the examplars during training, a new examplar is added to the graph when the examplar in the current image cannot be matched to a previously identified group of examplar nodes. At the same time, directed and weighted edges are aggregated between neighboring examplars to indicate the temporal relations and the expected accuracy of the matching.

Method Operation

Training

The training phase proceeds as shown in FIG. 1. A training video 101 is acquired of the soft tissues mass using sonography 154, e.g., the training video is acquired of the body of a patient during treatment planning. A region of interest (ROI) including the soft tissue mass to be tracked is marked in the first image in the training video as the current ROI. The marking indicates the location and approximate shape of the soft tissue mass. Alternatively, nothing is marked. Either the whole image or a group of selected sub-regions within the image are assigned as the ROI. The selection can be random.

We use the training video 101 to construct 110 a weighted directed graph (WDG) 111. This graph is used to find the location and shape of the soft tissue mass (tumor) during treatment time by tracking 120 the soft tissue mass in the weighted directed graph 111 using a treatment ultrasound video 102 as input. Then, the radiation beam 153 is guided and gated 130 using the location and shape 121.

After the ultrasound transducer 154 is positioned on the body of the patient, such that the ultrasound images depict the region of interest, e.g., the tumor or other soft issue masses region, a short video is recorded and utilized as the training video 101 to construct 110 the graph 111. This process can be done in real-time when the patient is prepared for the treatment as well. Several respiration cycles are recorded. Usually this corresponds to about a minute. However, depending on the breathing motion of the patient, the duration of the training video can be much shorter or longer.

Figure 2:
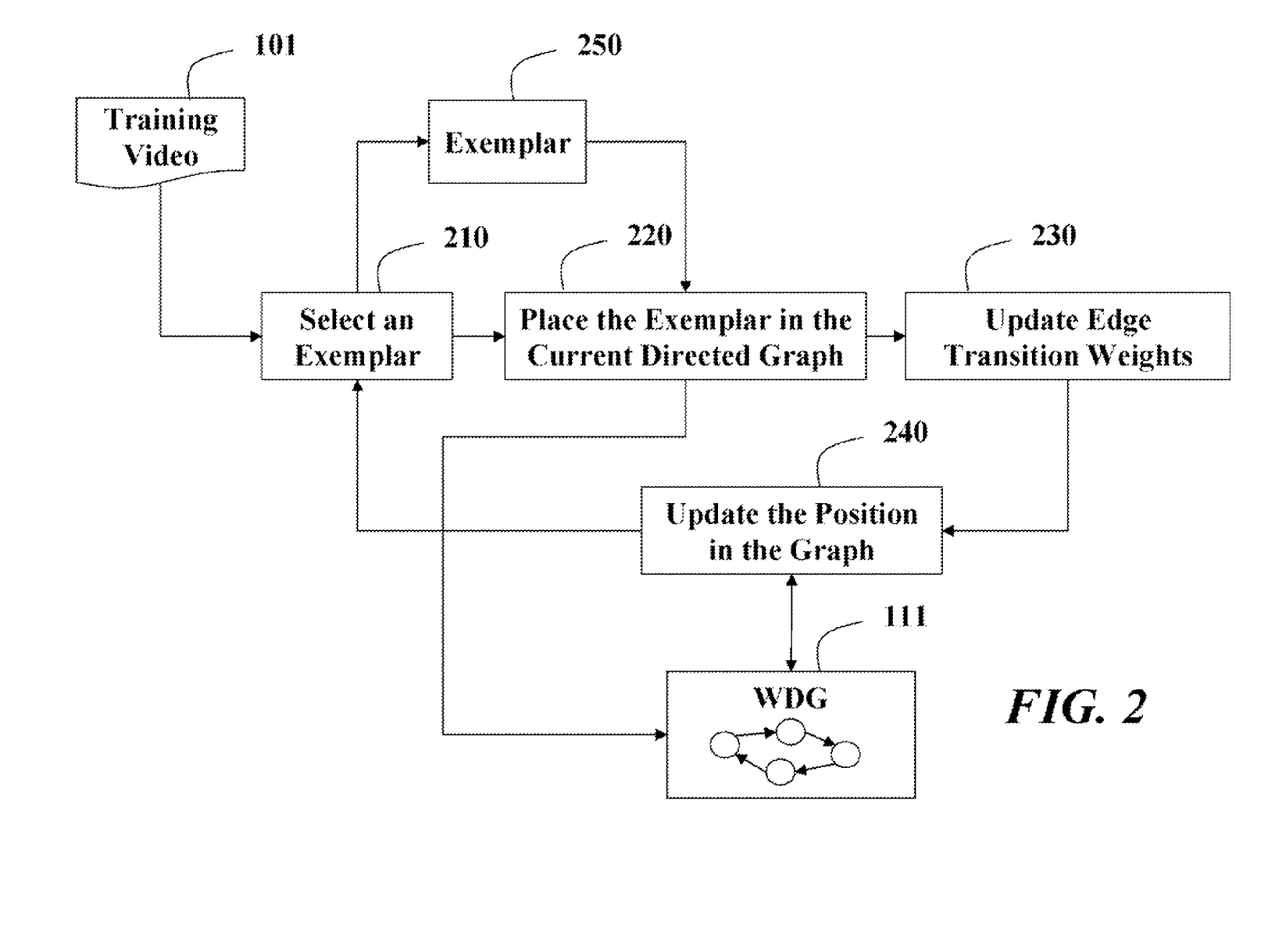
FIG. 2 is a block diagram of a procedure to construct a directed graph according to an embodiment of the invention.

Construction 110 of the graph 111 using the training video is shown in FIG. 2. We sequentially process the images of the ultrasound training video 101. We first select 210 an exemplar 250 from the training video 101 using a current position in the graph 11. We place 220 the exemplar 250 in the current directed graph 111. We update 230 edge transition weights 230, and update 240 the current position in the graph.

A number of different methods are possible for selecting 210 the examplar 250.

Figure 3:
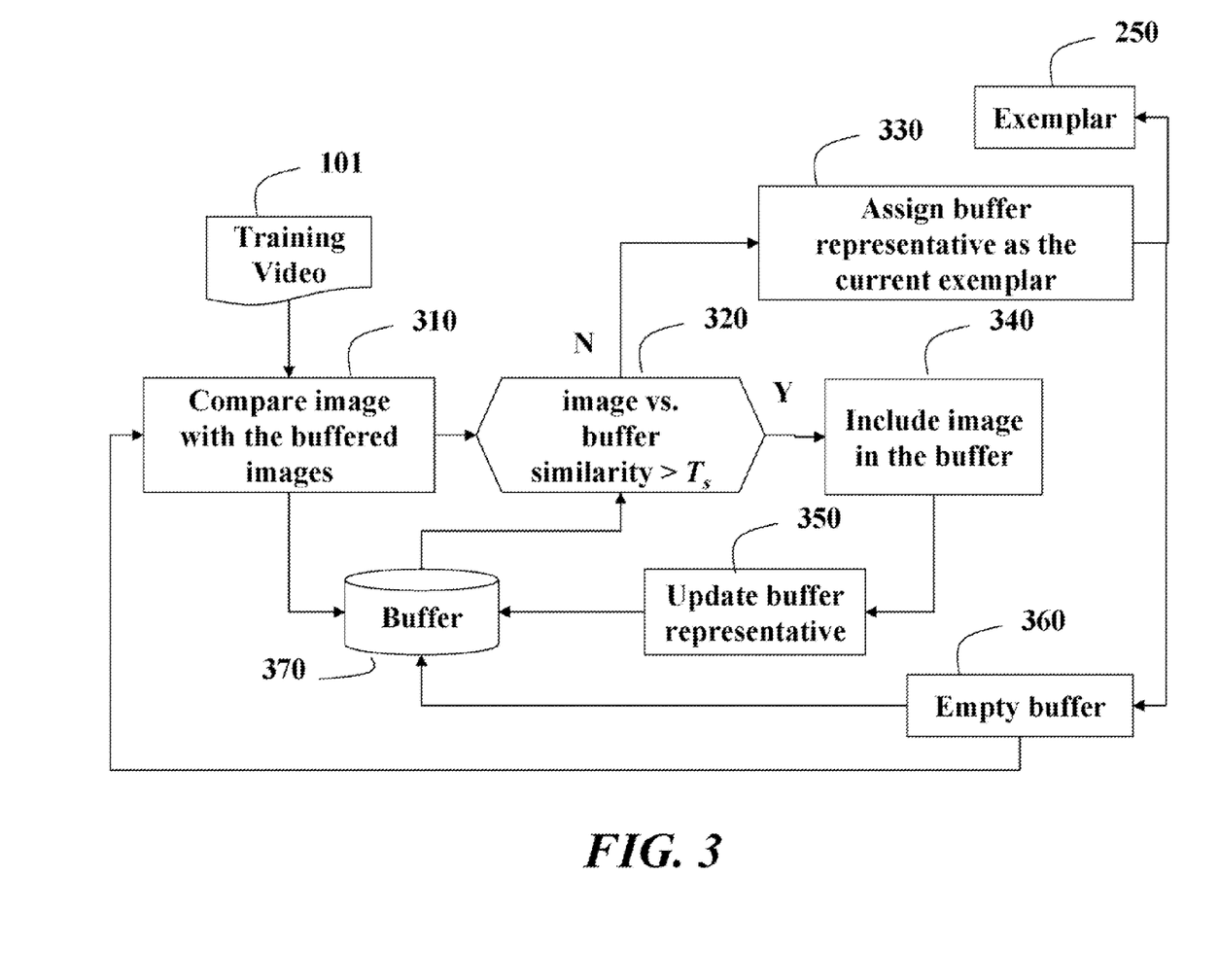
FIGS. 3-5 are block diagrams of procedures for selecting examplars according to an embodiment of the invention.

Method 1:

In the method shown in FIG. 3, we store a set of consecutive images of the training video in a buffer 370. At each image step, we compare 310 the new image with the images in the buffer. We determine 320 a similarity score between the new image and the buffered images. This score can be the minimum of the individual similarity scores between the new image and each of the buffered images, or the similarity score between the new image and a representative image in the buffer.

Note that, we use either the tracked ROI or the whole image as the ROI, or a set of tracked or static selected regions in the image to indicate a image. In the following discussion, "image" refers to any of these definitions in general.

Furthermore, each image (ROI) is represented by a descriptor, e.g., intensity templates, histograms, covariance matrices, Gabor filters, Haar wavelets, mixture of Gaussian functions, textons, edgelets, histogram of oriented gradients.

We determine 320 the similarity score between the new image and the images in the buffer 320. For instance, the new image is matched with the buffer descriptor using a normalized cross-correlation to determine the similarity score.

If this score is higher than a threshold $T_s$, then we consider the new image is similar to already buffered images, and include 340 the new image in the buffer 370. We update 350 the buffer representative, for instance, by taking a weighted average of the image descriptors.

If the similarity score is less than the threshold $T_s$, which indicates the new image is significantly different from the buffered images, then we assign 330 the buffer representative as the current exemplar 250, and empty 360 the buffer 3700, i.e., we remove the images from the buffer representative from the new image, and continue with the next image.

Figure 4:
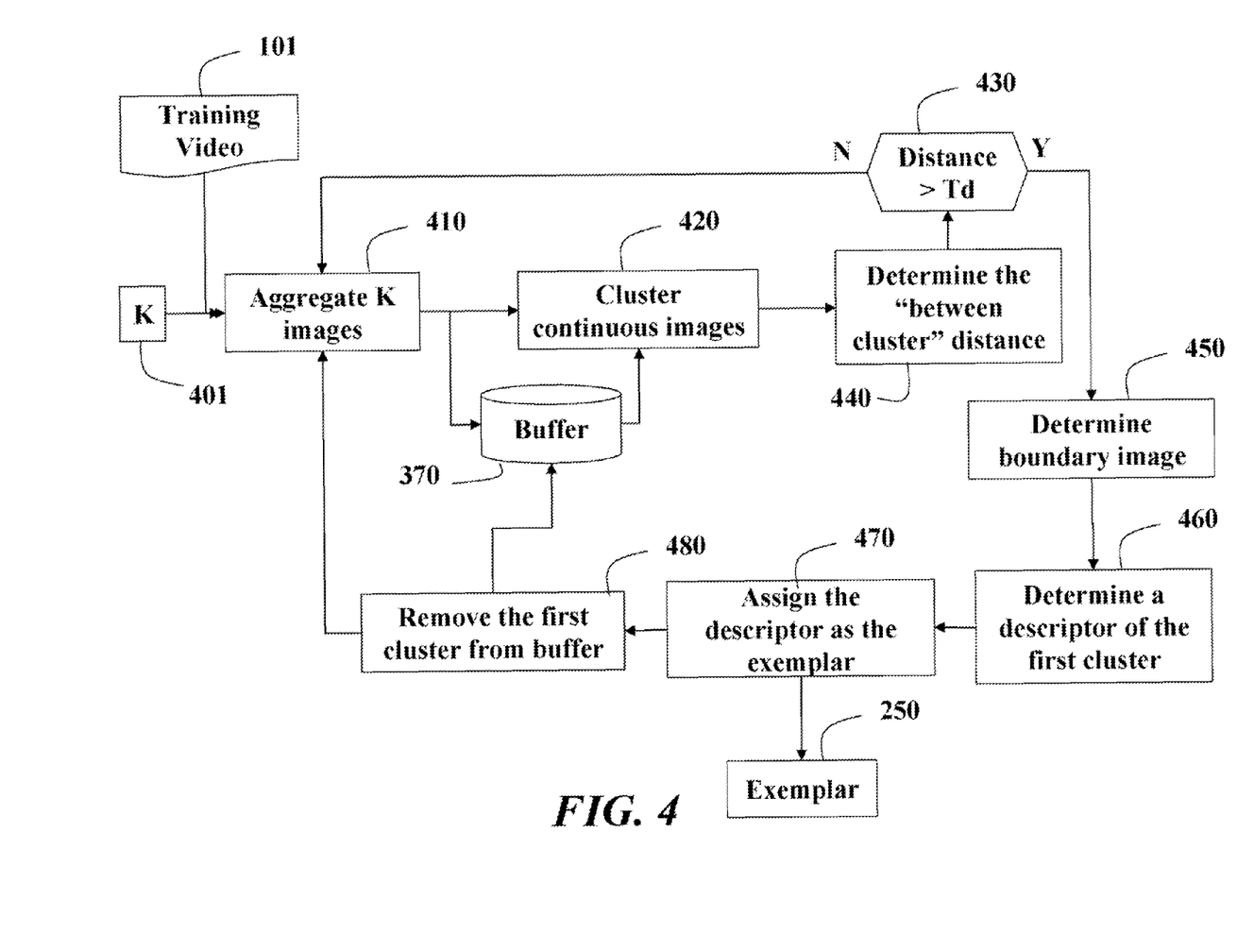

Method 2:

Alternatively as shown in FIG. 4, we first aggregate 410 K 401 images in the buffer 370. K can be a predetermined number or adaptively learned from the data. The number K determines the minimum number of images in the buffer. Alternatively, K can be set to a constant number, without the distance comparison step 430 described below. Image difference scores, motion field, etc. can be used to adapt the value of K.

When we have stored K images in the buffer, we cluster 420 these buffered images into two clusters, such that each cluster contains consecutive images. Then, we determine 440 a between cluster distance, which approximates an average distance between two individual cluster descriptors. The "between cluster distance" indicates the difference between clusters. If the distance is larger than a threshold $T_d$ 430, then we determine 450 the boundary image between two clusters, and determine 460 a descriptor for the first cluster, which temporally precedes the second cluster. We assign 470 the descriptor as the exemplar. We remove 480 the first cluster from the buffer 370. In case the "between cluster distance" is smaller than the threshold, we continue aggregating 410 the images from the training video 101. The exampler selection continues until all the images in the training data have been processed.

Figure 5:
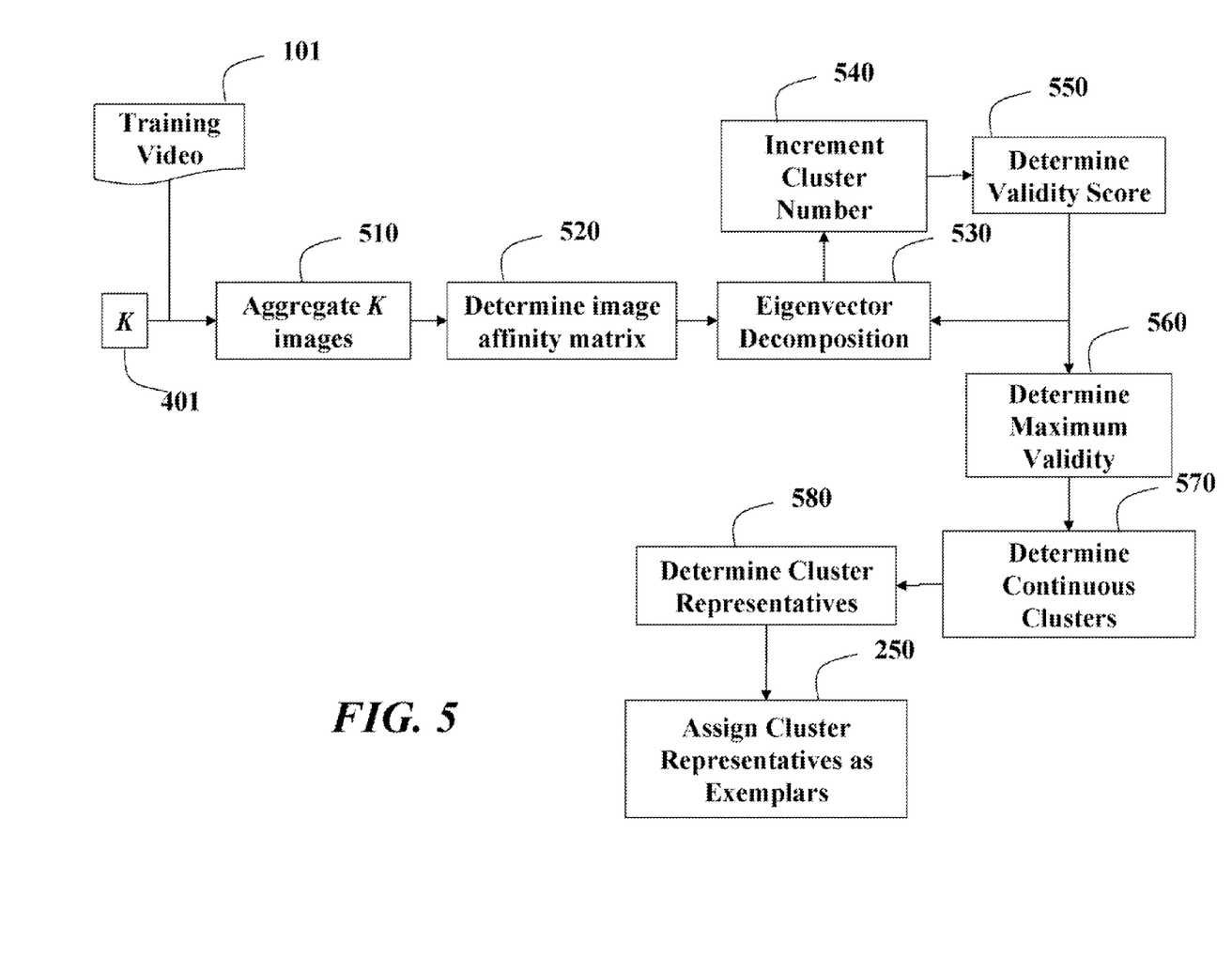

Method 3:

As shown in FIG. 5, it is also possible to select multiple exemplars at the same time. For this, we aggregate 510 K 401 consecutive images from the training video 101. This number is assigned such that it partitions a video segment whose last image is significantly different from its next neighboring image.

After K images are buffered, an affinity matrix, in which each coefficient correspond the similarity between a pair of images in the buffer, is determined 520. The dimension of the affinity matrix is the number of buffered images (K). The clustering is achieved by an eigenvector decomposition 530. In eigenvector clustering, the total number of clusters is given. This number is incremented 540 from two up to a maximum number. For each total number of clusters, a validity score is determined 550.

When the maximum total cluster number is reached, the maximum validity score and the corresponding total cluster numbers are determined 560. Then, we use the affinity matrix to determine 5470 temporally continuous clusters for the corresponding total cluster number. For each cluster, we determine 580 cluster representatives, and assign 250 all of these representatives as exemplars.

The above methods describe alternative ways of obtaining an exemplar 250. After we find an exemplar, we place the examplar 220 in the graph 111, update 230 edge transition weights, and update the latest position, which will be referred as a previous node.

Figure 6:
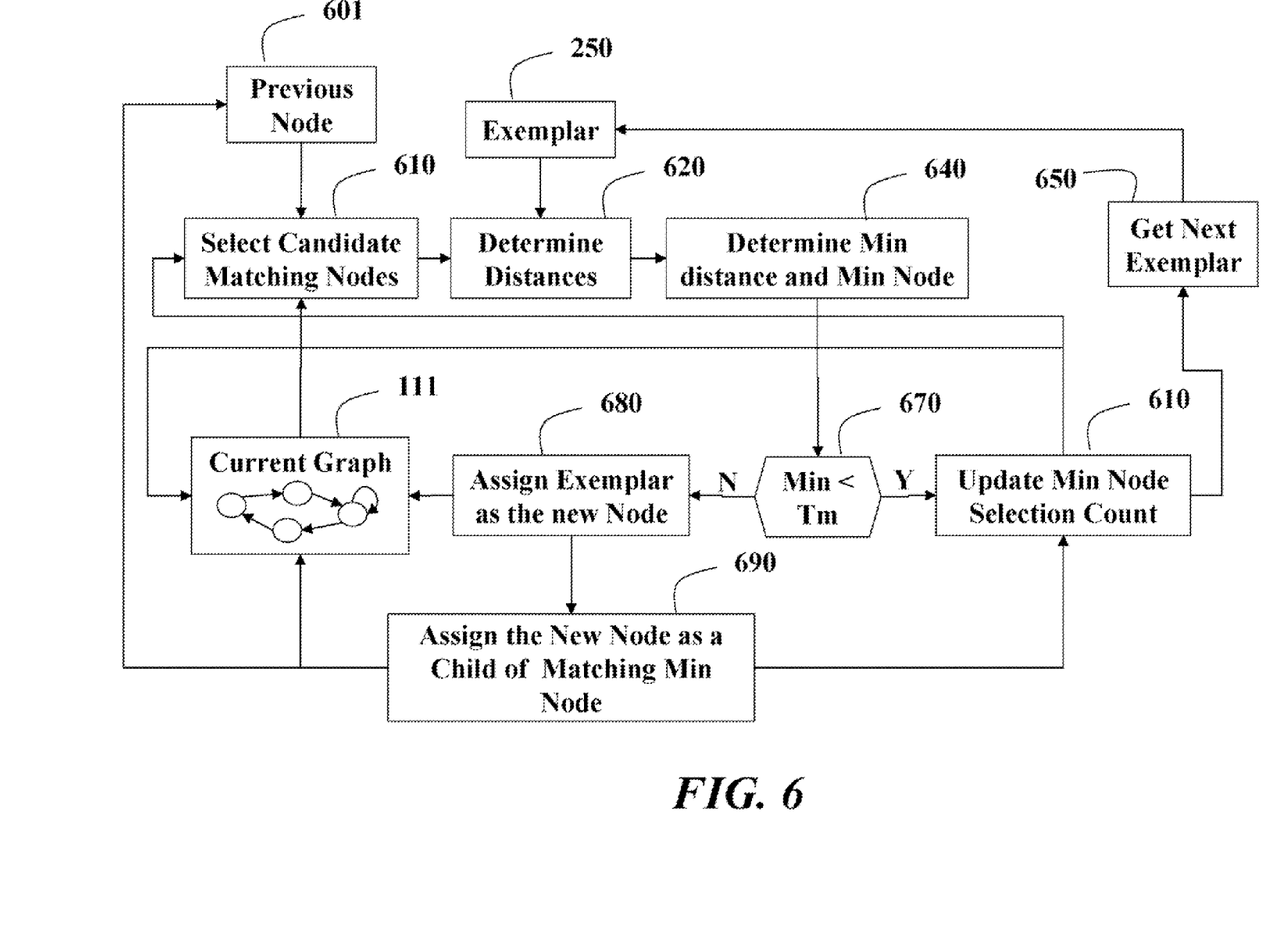
FIGS. 6-7 are block diagrams of procedures for placing selected examplars in the graph of according to an embodiment of the invention.

In the simplest case as shown in FIG. 6, each image is set as an exemplar. We have a previous node 601, Using the graph 111, 111 we determine 610 a set of candidate nodes, which includes the previous node and its children nodes at different graph depths. In other words, the set of candidate matching nodes contains the nodes that can be accessible through the outgoing edges from the previous node. It is also possible to associate the edge weights to filter 'weak' nodes, i.e. nodes with weak transitions.

The placing 220 of the exemplars in the graph 111 is as follows. For the exemplar 250 selected above, we determine 620 distances from the nodes in the matching set. We determine 640 the node that has the minimum distance. If the minimum distance is less than 670 a threshold $T_m$, we update 645 the corresponding node selection count 730 that is recorded for each node in the training phase, see FIG. 7. This number indicates how many exemplars are matched to the node. We update the current graph's 111 edge weights, revise the candidate selection count 730, and continue processing of the next exemplar 650.

If the minimum distance is not less than the threshold, we consider the exemplar as a node. We assign 680 the new node as a child of the matching node that has the minimum distance obtained above. We update the graph.

Figure 7:
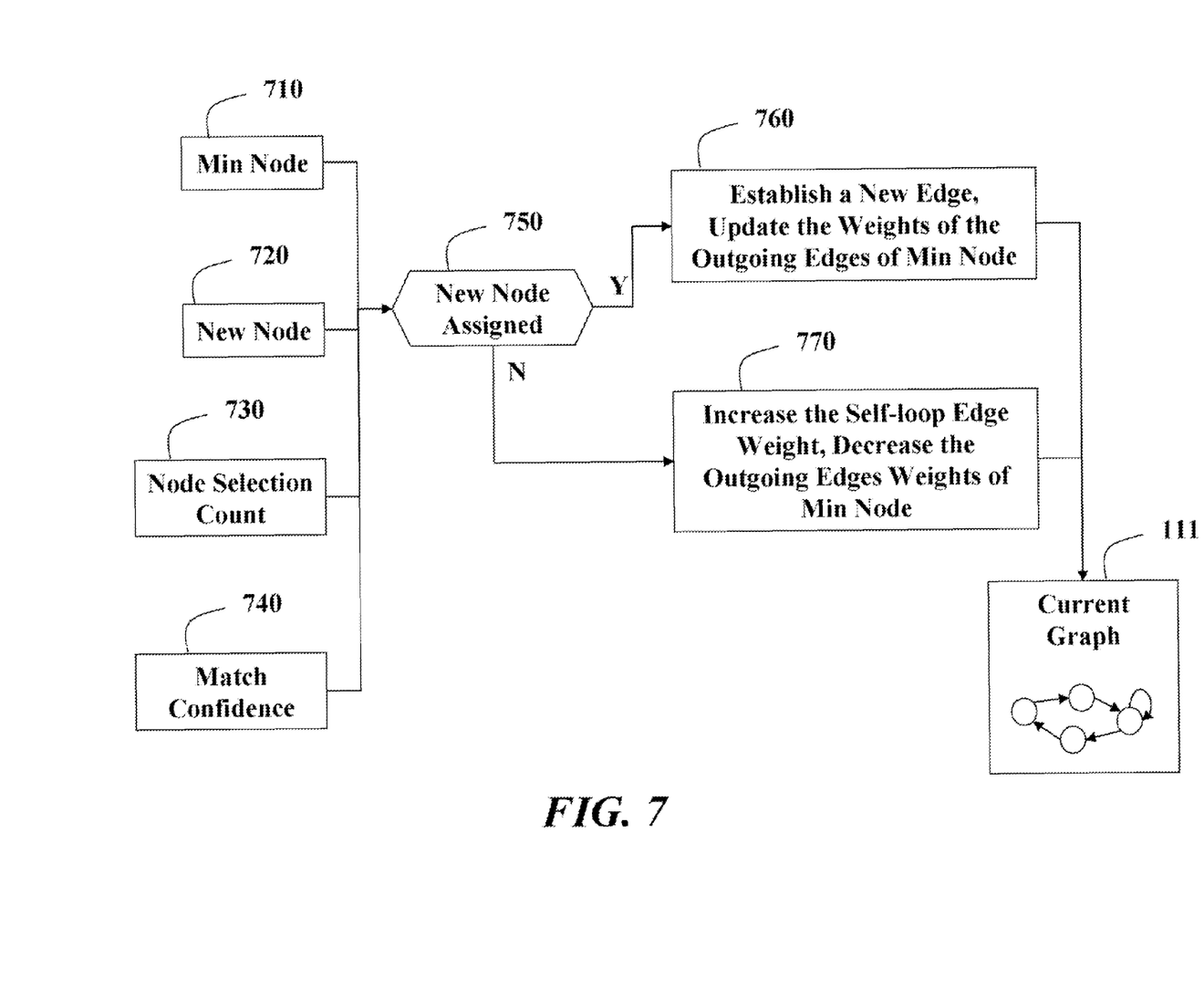

The updating 230 of the edge transition weights is shown in FIG. 7. From the previous stage, we have the node with the minimum distance 710 (i.e., the parent node to which a new node 720 connected as a child from the exemplar), the new node 720, the node selection count 730 of the parent node, and the match confidence 740, which is the inverse of the minimum distance.

If a new node assignment is made 750, we establish 760 a new edge between the new and parent nodes, update the weights of the outgoing edges of the parent node. Otherwise, we increase 770 the weight of the self-loop edge of the minimum node, and decrease weights of the remaining outgoing edges of the minimum node proportionally.

The output of the training is the directed graph 111 of images (or ROI's, or image regions, etc). The training procedure is fully automatic after the first image is selected or the ROI is marked. However, the user can manually mark any ROIs during both during raining and treatment.

For tumor radiation, the patient is instructed not to move during treatment. Restraining devices can also be used to immobilize parts of the body where the tumor is located. Thus, any movement of the tumor is primarily due to breathing motion. Because the respiratory cycle is fairly regular over time, both in pace and depth for a particular person, the above temporally directed edges in our graph can capture the cyclicity of the breathing, and accurately predict the movement of the tumor using a graph of a relatively small size. The cyclicity of phases of the breathing will be observed in the directed graph 111 by the nodes looping back over each other.

Phase Estimation and Tracking

During treatment, a treatment ultrasound video 102 is acquired. Each incoming image is matched with the nodes int he graph. Because, the graph indicates the temporal relations between the nodes, we can search for a match according to the temporal order if the current node does not match the next image using a breadth-first search of the directed graph.

The graph corresponds to the respiration cycle. For such a cycling motion, the graph can be collapsed on the nodes between the breath-in and breath-out nodes. In other words, it is possible to determine the breath-in and breath-out nodes and the respiration phase between them from the graph automatically by testing and between node distances, e.g., using the spectral clustering. This can also be labeled manually after the graph is constructed.

Phase Estimation Procedure

If there is no current node, then we search all nodes to find a matching node and set the current node to be this matching node. If no matching node can be found, then we set the current node to be empty until a valid match is obtained. By adjusting the matching threshold, or always selecting the node with the minimal distance, the current node can be set.

Figure 8:
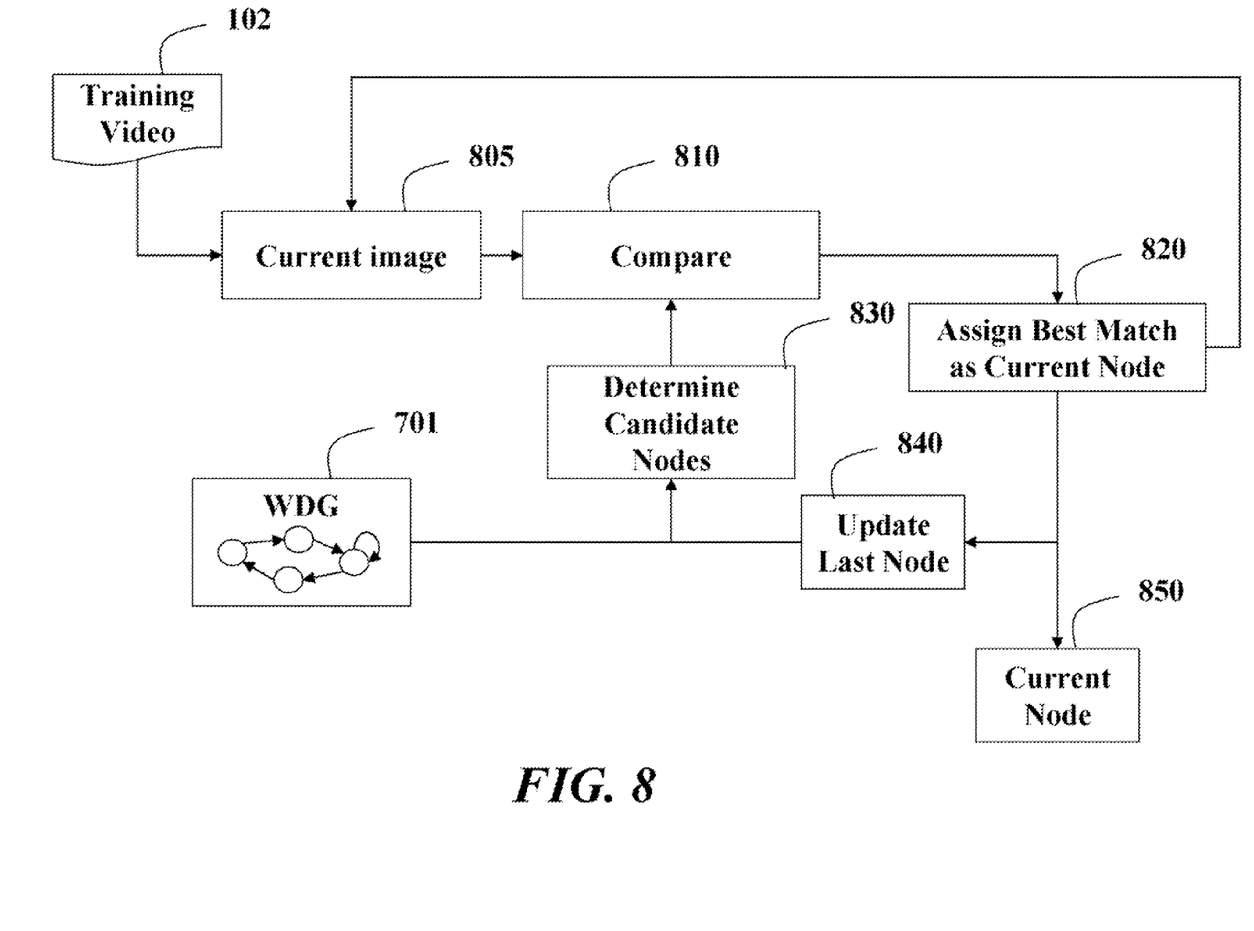
FIGS. 8-10 are block diagrams of procedures for estimating phases according to an embodiment of the invention.

Otherwise as shown in FIG. 8, we compare 810 the incoming image, e.g., the current image 805 with the current node using the previously described metrics. Based on the previous node 840 and the graph 111, we construct a set of candidate nodes 830 for a breadth-first search. The candidate nodes contain the children nodes of the previous node up to a certain depth.

After comparing and determining the distances, we assign 820 the node with the minimum distance as the best match to the current image, i.e., the current node 850. We update 840 the previous node 840 as the current node 850. Current node represents the corresponding image of the input image in the graph. Using the graph and the current node, the current respiration phase is found for the current image 805.

Figure 9:
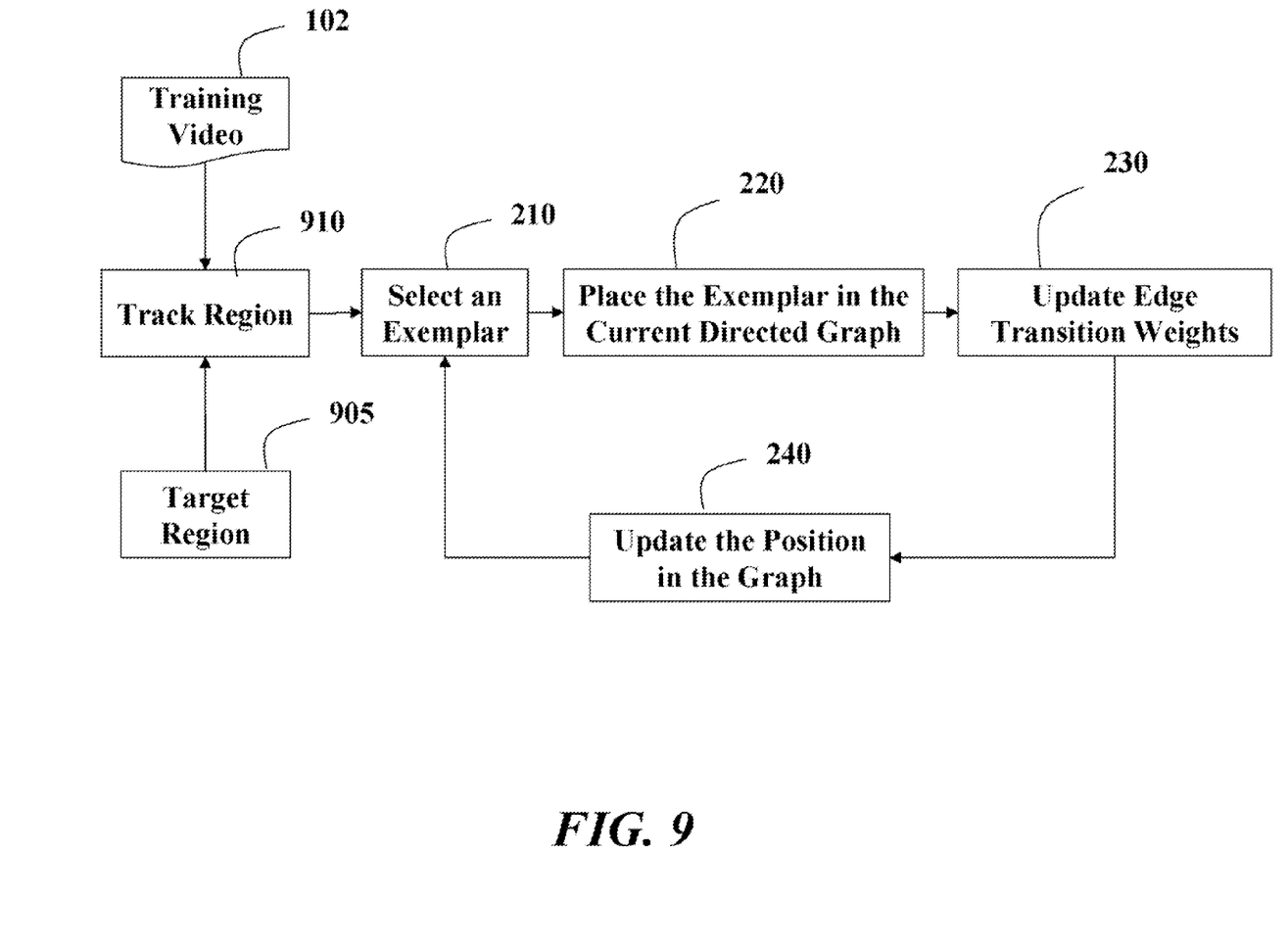
Figure 10:
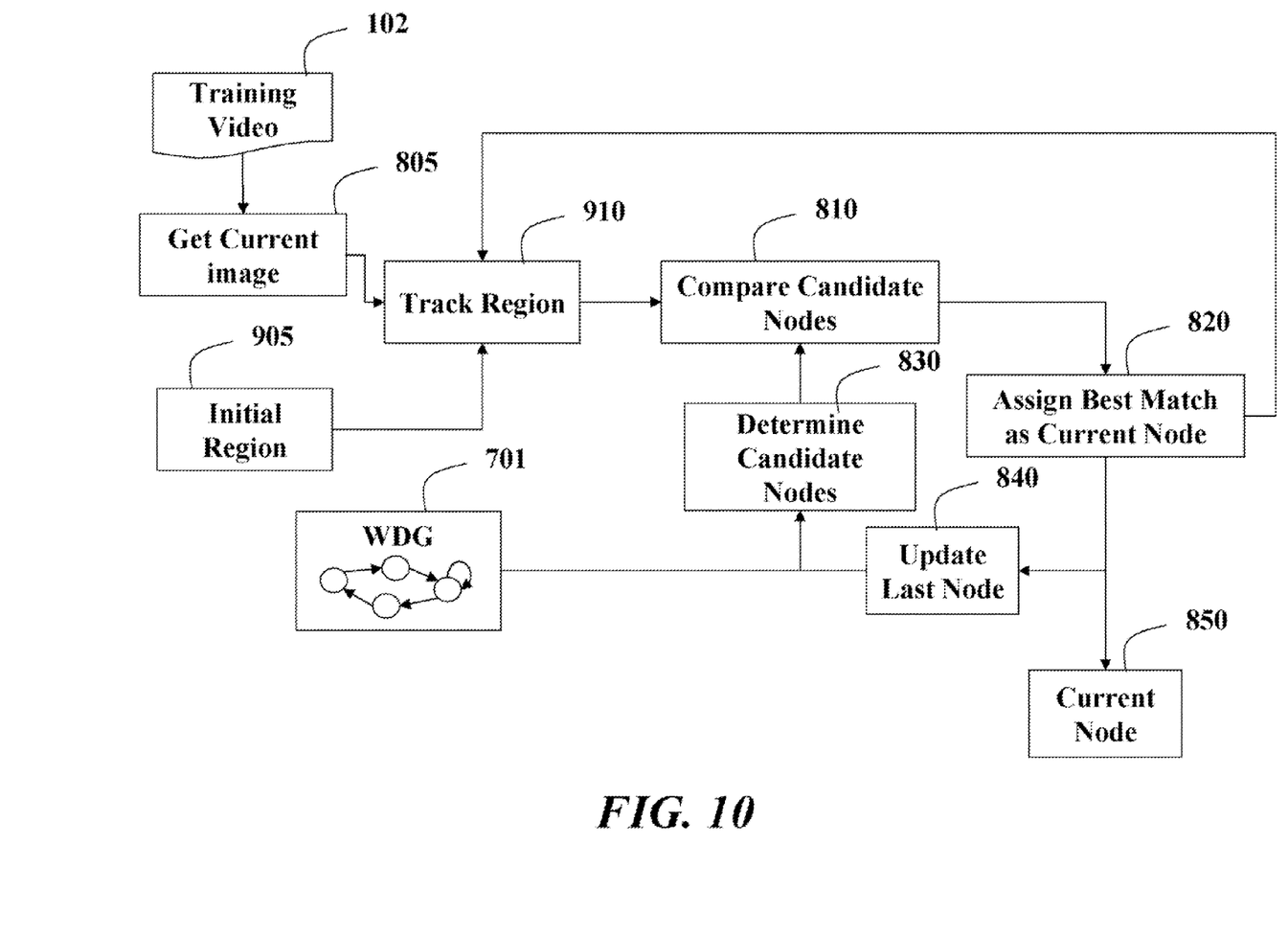

Instead of using all pixels in the input image, a target region 905, e.g., a ROI, or a collection of sub regions can be used as shown in FIG. 9. In these cases, we track 910 the ROI or the collection of regions to ensure the target region is still detectable in a given image. Alternatively, we use static regions without tracking. The above training and phase estimation is similar, except the ROIs in the current images are obtained by tracking. Tracking 910 of ROI 904 can be done using a normalized cross-correlation distance, a sum-of-squared distance, or any other region comparison metric within standard tracking methods including, but not limited to, exhaustive search, regression tracking, mean-shift tracking, gradient search, particle tracking etc.

If the ROI is used for image, then the above procedure outputs the matching node and its ROIs location 121 in each image, or signals that no matching ROI can be found). The locations 121 of the ROI corresponds to the locations of the soft tissue mass, in case the initial ROI is encloses the mass.

Consequently, the radiotherapy beam can be directed 130 in such a way as to track the location of the moving tumor, or alternatively to turn the beam off when the tumor cannot be located. If the shape of the tumor is also tracked, the collimator for the beam can also be adjusted to match the shape of the tumor in real-time as treatment is being delivered.

Note that, the above training and estimation procedures are not limited to breathing phase estimation. For instance, the ultrasound can image the heart in the pericardium. Thus, the observed cyclic motion and the corresponding graph correspond to the rhythmic contraction and expansion of the arteries with each beat of the heart.

We can use the respiration, cycle phase estimation for other applications than tracking tumors and other tissues in a radiotherapy or other treatment protocols. One application collects a multitude of images corresponding to the same phase using the graph. Then, the set of images of the same node can be 'fused' to obtain a higher resolution data (2D image, 3D surface, higher resolution motion field, etc), 2) with decreased noise.

The above described methods are not limited to 2D ultrasound video as the input data. For example, we can use 3D and 4D video. Observations, images, temporally extracted samples, 3D surfaces, 4D surfaces with motion, 2D Doppler, 3D Doppler, etc, can be converted to an exemplar representative that has any form within a vector space or on a manifold.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A computer implemented method for tracking a soft tissue mass, comprising the steps of:
    acquiring a training video of a soft tissues mass inside a body using sonography, in which the training video includes a sequence of images;
    marking a region of interest (ROI) corresponding to a location of the soft tissue mass in a first frame of the training video;
    constructing a directed graph of nodes and edges in a memory while tracking the ROI in each image in the sequence of the training video, in which each node represent a location of the tracked ROI, and the edges represent temporal relations of the ROIs;
    acquire a treatment video of the soft tissue mass using the sonography; and
    tracking the soft tissue mass in the treatment video according to the directed graph.

2. The method of claim 1, in which a location of the soft tissue mass is tracked.

3. The method of claim 2, in which, the location is correlated to a cyclic behavior of respiration.

4. The method of claim 2, in which the location is correlated to pulsation of a heart.

5. The method of claim 1, in which a shape of the soft tissue mass is tracked.

6. The method of claim 1, in which the soft tissue mass is a tumor, and the tracking is used to control a radiation beam directed at the tumor.

7. The method of claim 6, in which the controlling turns the beam on and off.

8. The method of claim 6, in which a depth of maximum exposure is controlled.

9. The method of claim 1, further comprising;
    increasing a resolution of the images according to the tracking.

10. The method of claim 1, further comprising:
    decreasing noise in the images according to the tracking.

11. The method of claim 1, in which the sonography uses a Doppler ultrasound signal.

12. The method of claim 1, in which the ROI is an entire image.

13. The method of claim 1, in which the images are normalized.

14. The method of claim 1, in which the tracking matches each image with the ROIs represented in the graph using a normalized cross-correlation to obtain a score.

15. The method of claim 1, in which the tracking matches each image with the ROIs represented in the graph using a sum-of-squared difference metric.

16. The method of claim 15, in which each edge is weighted according to a normalized number of transitions made from a current node to a child node, and the matching score.

17. The method of claim 1, in which the images are stored in a buffer in a memory.

18. The method of claim 17, in which images stored in the buffer are replaced according to a similarity score.

19. The method of claim 17, in which images stored in the buffer as clusters, and the images in the clusters are replaced according to a cluster distance.

20. The method of claim 17, in which images stored in the buffer as clusters using an affinity matrix, and an eigenvector decomposition.

21. The method of claim 1, further comprising:
    representing each image with a descriptor.

22. The method of claim 21, in which the descriptor is a histogram, a covariance matrix, a Gabor filter, Haar wavelets, a mixture of Gaussian functions, textons, edgelets, or a histogram of oriented gradients.

23. The method of claim 1, in which the tracking uses a breadth-first search of the graph.

24. The method of claim 1, in which the tracking uses a normalized cross-correlation distance, a sum-of-squared distance, an exhaustive search, regression tracking, mean-shift tracking, gradient search, or particle tracking.

25. A system for tracking a soft tissue mass, comprising:
    means for acquiring a training video of a soft tissues mass inside a body using sonography, in which the training video includes a sequence of images;

means for marking a region of interest (ROI) corresponding to a location of the soft tissue mass in a first frame of the training video;
means for constructing a directed graph of nodes and edges in a memory while tracking the ROI in each image in the sequence of the training video, in which each node represent a location of the tracked ROI, and the edges represent temporal relations of the ROIs;
means for acquire a treatment video of the soft tissue mass using the sonography; and
means for tracking the soft tissue mass in the treatment video according to the directed graph.

* * * * *